United States Patent [19]

Shen

[11] Patent Number: 5,000,583
[45] Date of Patent: Mar. 19, 1991

[54] WHEEL OF DRAWER SLIDE SET

[76] Inventor: Ming T. Shen, No. 909, Fu Hsin Road, Chupei, Hsinchu, Taiwan

[21] Appl. No.: 519,166
[22] Filed: May 4, 1990
[51] Int. Cl.$^5$ .................. A47B 88/14; F16C 19/00
[52] U.S. Cl. .................. 384/19; 312/341.1; 384/58
[58] Field of Search ............ 384/19, 22, 58; 312/333, 341.1

[56] References Cited

U.S. PATENT DOCUMENTS

| 2,843,444 | 7/1958 | Nelson | 312/341.1 |
| 3,361,489 | 1/1968 | Gionet | 384/19 |
| 3,874,748 | 4/1975 | Figueroa | 384/19 |
| 4,863,288 | 9/1989 | Houck | 384/19 |

Primary Examiner—Thomas R. Hannon
Attorney, Agent, or Firm—Notaro & Michalos

[57] ABSTRACT

The present invention relates to improved wheel drawer slide set, which includes a wheel having a firm engagement with a gear and may be mounted pivotally to the drawer slide by an axle. It provides such a firm engagement between the wheel, the gear, and the axle to obtain enough strength to load heavily and to provide automatic lateral self-adjustment to compensate for cabinets.

1 Claim, 3 Drawing Sheets

WHEEL OF DRAWER SLIDE SET

BACKGROUND OF THE INVENTION

The present invention relates to an improved wheel of a drawer slide set, and more particularly to a wheel assembly which is mounted to the guide or the slide of a drawer slide set to provide for automatic lateral self-adjustment of drawer set to compensate for cabinets with a firm engagement.

In the prior art, as in U.S. Pat. No. 4,863,288 which is shown in FIG. 2, the known floating wheel (1) of a drawer slide (4) is structured and arranged to permit free travel of wheel along axle (2) over a predetermined range, and provides for automatic lateral self-ajustment of drawer slide to compensate for cabinets having sidewalls deviating significantly from parallel configuration. A main drawback of the prior art wheel assembly is that is can not provide a firm engagement between the wheel (1) and the guide or the slide of a drawer slide (4) because of only a small contacting surface between the central hole (11) of the wheel (1) and the axle (2). The wheel (1) might be inclined when the cabinet is heavily loaded, which disturbs the smooth sliding, and the engagement therebetween might even be destroyed.

SUMMARY OF THE INVENTION

It is the purpose of this present invention to mitigate and/or obviate the above-mentioned drawbacks in the manner set forth in the description of the preferred embodiment.

A primary purpose of the present invention is to provide an improved wheel assembly of a drawer slide set to provide for automatic lateral self-adjustment of drawer set to compensate for cabinets with a firm engagement and enough strength the therebetween.

Another purpose of the present invention is to provide a wheel assembly including a wheel, a gear, and an axle which can be assembled with ease and rapidly produced without difficulty.

Further objectives and advantages of the present invention will become apparent as the following description proceeds, and the features of novelty which characterize in the claims annexed to and forming a part of this invention.

DETAILED DESCRIPTION OF THE PREFERRED EMBODIMENT

The following is a detailed description of the best presently contemplated embodiment of the invention. This description is not to be taken in a limiting sense, but is made merely for the purpose of illustrating the general principles of the invention.

Figure 1:
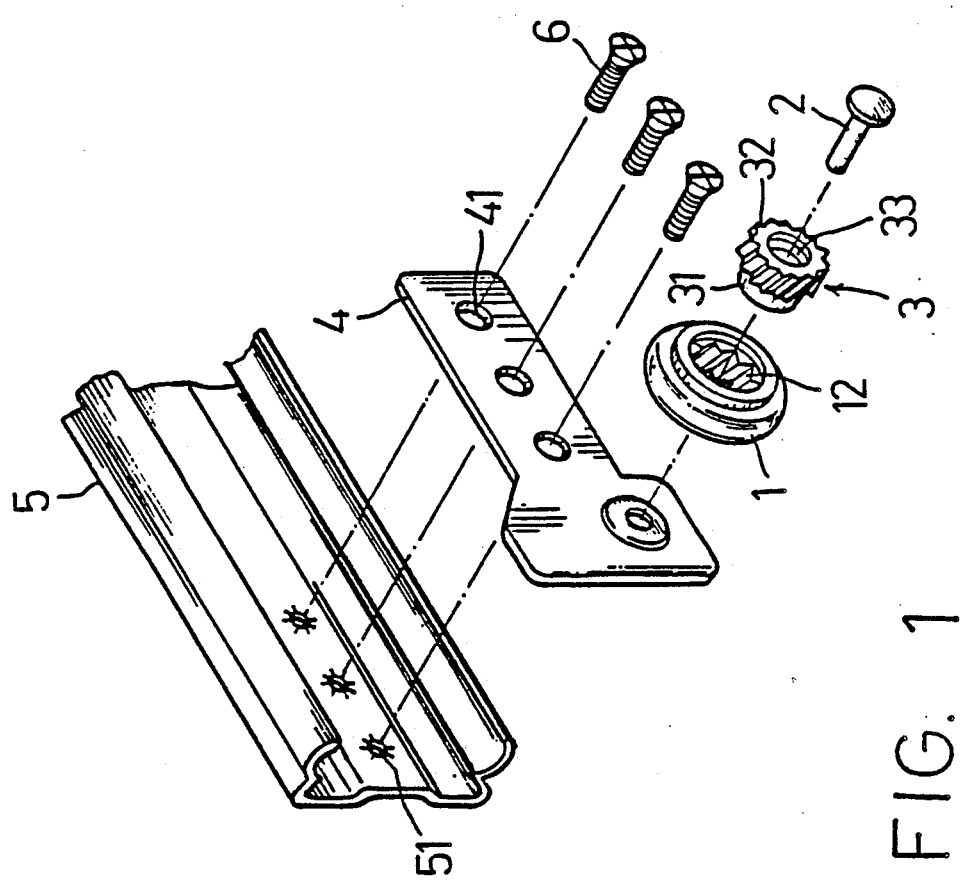
FIG. 1 is a perspective exploded view of a drawer slide set according to the present invention.
Figure 2:
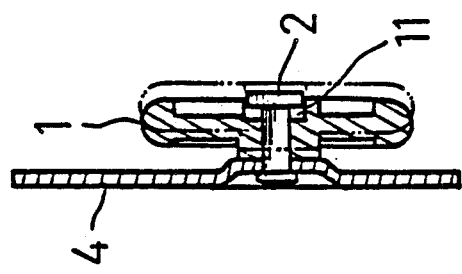
FIG. 2 is a cross-sectional view of the wheel assembly according to the prior art.
Figure 3:
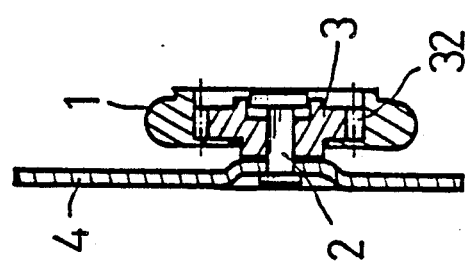
FIG. 3 is a cross-sectional view of the wheel assembly according to the invention.

Referring to FIGS 1 and 3, it can be seen that the present invention includes a slide-connector (4), a slide-rail (5), and a wheel assembly. The connector (4) and the rail (5) are connected and mounted to the sidewalls of a cabinet by the use of several screws (6) which penetrate the holes (41) and the holes (51). The wheel assembly includes a wheel (1), a gear (3), and an axle (2), wherein the wheel (1) is provided with a central hole (11) and a side thread hole (12) having slightly inclined inner threads. The said gear (3) is formed with a connective shaft (31) and a thread portion (32) having slightly inclined outer threads, and is engaged with the wheel (1) respectively. The said axle (2) passes through the central hole (33) of the gear (3) to mount the wheel assembly to the connector (4) of the drawer slide set.

It can thus be understood from the aforesaid description as well as from the FIG. 3 that the axle (2) is pivotally connecting the wheel assembly to the connector (4). Because of the slightly inclined thread engagement between the wheel (1) and the gear (3), it permits unbiased free travel of wheel (1) along the gear (3) and the axle (2) over a predetermined range and provides for automatic lateral self-adjustment of drawer slide to compensate for cabinets having sidewalls deviating from parallel configuration. And the true improvement is that the contacting surface between the wheel (1) and the gear (3) is maintaining a whole surrounding surface of all threads thereof whenever it stands in any lateral position. Is can provide a firm engagement and enough strength to load heavier than ever without destruction.

As various possible embodiments might be made of the above invention without departing from the scope of the invention, it is to be understood that all matter herein described or shown in the accompanying drawings is to be interpreted as illustrative and not in a limiting sense. Thus it will be appreciated that the drawings are exemplary of a preferred embodiment of the invention.

I claim:

1. An improved wheel assembly of a drawer slide set comprising:

a wheel having a central hole and a side thread hole with slightly inclined inner threads thereof;

a gear having a smooth shaft and a thread portion with slightly inclined outer threads thereof to penetrate the said wheel for a repective engagement with the said central hole and the said thread side hole of the wheel;

an axle passing through the central hole of the said gear to pivotally connect the wheel assembly to the drawer slide; and the wheel assembly providing a firm emgagement between the wheel, the gear, and the axle to obtain enough strength to load heavily and to provide automatic lateral self-adjustment to compensate for cabinets.

* * * * *